(12) United States Patent
Lakeman et al.

(10) Patent No.: US 8,063,126 B2
(45) Date of Patent: Nov. 22, 2011

(54) HEAVY METAL DEACTIVATOR/INHIBITOR FOR USE IN OLEFINIC POLYMERS

(75) Inventors: Pascal E. R. E. J. Lakeman, Bergen op Zoom (NL); Thoi H. Ho, Lake Jackson, TX (US); Ronald Wevers, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 78 days.

(21) Appl. No.: 12/596,121

(22) PCT Filed: Mar. 17, 2008

(86) PCT No.: PCT/US2008/057224
§ 371 (c)(1),
(2), (4) Date: Oct. 15, 2009

(87) PCT Pub. No.: WO2008/127830
PCT Pub. Date: Oct. 23, 2008

(65) Prior Publication Data
US 2010/0120954 A1 May 13, 2010

Related U.S. Application Data

(60) Provisional application No. 60/911,096, filed on Apr. 11, 2007.

(51) Int. Cl.
*B60C 1/00* (2006.01)
(52) U.S. Cl. .......................................... 524/191; 524/189
(58) Field of Classification Search .................... 524/191
See application file for complete search history.

(56) References Cited

U.S. PATENT DOCUMENTS

| 3,798,286 A | 3/1974 | Reid |
| 3,931,103 A | 1/1976 | Hardy |
| 4,043,976 A * | 8/1977 | Yoshikawa et al. ........... 524/191 |

FOREIGN PATENT DOCUMENTS
EP 0 565 868 A2 10/1993

* cited by examiner

*Primary Examiner* — Milton I Cano
*Assistant Examiner* — Wenwen Cai
(74) *Attorney, Agent, or Firm* — Whyte Hirshboeck Dudek SC

(57) ABSTRACT

An olefine polymer composition comprises a stabilizing amount of a metal deactivator comprising a polymeric hydrazine derivative. The deactivator is of formula (I), in which at least one of $R_1$ and $R_2$ comprise a polymeric radical that includes a substituted or unsubstituted aromatic radical, provided that $R_1$ and $R_2$ are not both of formula (II). The olefin polymers include polyethylene and polypropylene.

8 Claims, No Drawings

HEAVY METAL DEACTIVATOR/INHIBITOR FOR USE IN OLEFINIC POLYMERS

CROSS-REFERENCE STATEMENT

This application is national stage of PCT/US08/57224 filed on Mar. 17, 2008, which claims the benefit of U.S. Provisional Application Ser. No. 60/911,096 filed on Apr. 11, 2007.

FIELD OF THE INVENTION

This invention relates to olefinic polymer compositions. In one aspect, the invention relates to olefinic polymer compositions that are resistant to oxidative deterioration while in another aspect, the invention relates to such compositions that are resistant to oxidative deterioration that is catalytically accelerated by heavy metals. In still another embodiment, the invention relates to water pipes and filled cable sheaths made from such compositions.

BACKGROUND OF THE INVENTION

Unprotected olefin polymers are known to degrade over time when in contact with a heavy metal. For example, if an unprotected olefin polymer, e.g., polypropylene, is used to cover copper wire, the copper wire will promote or catalyze the scission of the polymer. Accordingly, many compounds have been developed over the years to protect an olefin polymer from such degradation. Among these compounds are various hydrazines.

U.S. Pat. No. 4,043,976 describes a stabilized olefin polymer composition having resistance against deterioration caused by contact with heavy metals such as copper, the composition comprising an olefin polymer and from 0.001 to 5 parts by weight of an N,N'-dibenzoylhydrazine derivative. While demonstrating effectiveness to one degree or another, these hydrazines also demonstrate less than desirable compatibility with many olefin polymers and thus have a tendency to migrate over time out of the polymer composition. This migration reduces the amount of compound in the polymer composition, and this in turn reduces the protection to the olefin polymer or, alternatively, requires that more compound must be used than would otherwise be required if migration was not a problem.

SUMMARY OF THE INVENTION

In one embodiment, the invention is an olefin polymer composition comprising a stabilizing amount of a metal deactivator of formula (I):

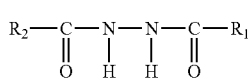

in which at least one of $R_1$ and $R_2$, are of formula (II):

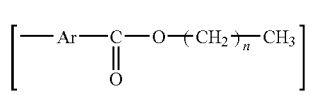

in which Ar is a substituted or unsubstituted aromatic group, and n is an integer of 1 to 10;

or at least one of $R_1$ and $R_2$ are of formula (III):

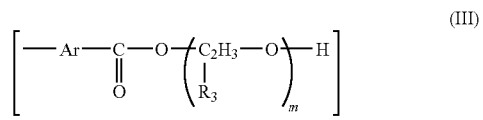

in which Ar is a substituted or unsubstituted aromatic group, m is an integer of 1 to 1000, and $R_3$ is hydrogen or a $C_{1-12}$ alkyl group such as methyl, ethyl, propyl, butyl, hexyl, octyl, etc.; or at least one of $R_1$ and $R_2$ are of formula (IV):

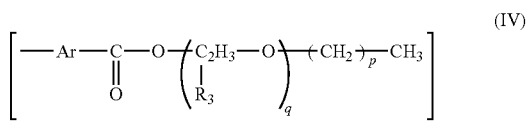

in which Ar is a substituted or unsubstituted aromatic group, and each of p and q is an integer of at least one.

Ar can be of any aromatic structure, e.g., phenyl, naphthyl, polycyclic (e.g., anthracene, phenanthrene, etc.), biphenyl, etc., and it can be substituted or unsubstituted and if substituted, it can contain multiple substituents, e.g. terephthalic-based. For example, if Ar is phenyl, then it can contain up to four carboxylic acid groups although Ar is typically an unsubstituted phenyl group. $R_3$ is the result of the addition of ethylene, propylene or butylene oxide, respectively, during the preparation of the compound. The alkoxide and alkyl units of the formula III group can be arranged in blocks of any order or randomly distributed throughout the group. If $R_1$ and $R_2$ are not both of a formulae (II)-(IV) structure, then the one that is not is typically a $C_1$-$C_{20}$ hydrocarbyl group, or a group containing a hindered phenolic functional group.

In another embodiment, the invention is an olefin polymer composition comprising a stabilizing amount of a metal deactivator of formula (V):

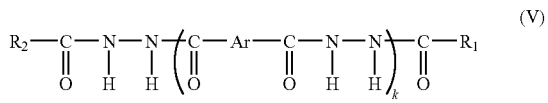

in which k is at least one.

The metal deactivators used in the practice of this invention can be tailored to maximize their solubility in the olefin composition, thus providing the composition with good resistance to metal deactivator depletion and optimal stabilization at a micro-scale level.

DESCRIPTION OF THE PREFERRED EMBODIMENT

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of metal deactivator in the olefin polymer composition, and the various subscript values of formulae (II)-(V).

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Olefin polymer", "polyolefin", "PO" and like terms mean a polymer derived from simple olefins. Many polyolefins are thermoplastic and for purposes of this invention, can include a rubber phase. Representative polyolefins include polyethylene, polypropylene, polybutene, polyisoprene and their various interpolymers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Stabilizing amount" and like terms mean an amount of metal deactivator in an olefin polymer composition sufficient to stabilize or protect the olefin polymer against substantial degradation due to heavy metal catalyzed oxidation.

"Heavy metal" and like terms mean a metal of atomic weight greater than sodium that forms soaps on reaction with fatty acids, e.g., copper, aluminum, lead, etc.

The metal deactivators used in the practice of this invention are of formula (I), and preferably Ar is an unsubstituted phenyl radical, n is preferably an integer ranging from 1 to 10 and more preferably from 1 to 2, m is preferably an integer ranging from 1 to 1000 and more preferably from 5 to 300, $R_3$ is preferably a $C_{1-12}$ alkyl group such as methyl, ethyl, propyl, butyl, hexyl, octyl, etc., p and q are the same or different and preferably each is at least 1 and more preferably q is at least 5, and k is preferably an integer of at least 1 and more preferably of at least 2. Preferably, the metal deactivator is tailored for use with a specific polyolefin composition such that the deactivator has the desired solubility properties in the final product, not just during the processing, e.g., melt, stage of the polymer. With enhanced solubility in the final polyolefin composition, the deactivator is more resistant to migration from the composition. For example, in pipe applications the metal deactivator is needed at the outer pipe surface to provide better oxidative stability. With enhanced solubility in the final product, the metal deactivator is more easily geometrically oriented in the final product (as compared to a less soluble deactivator), and thus less likely to migrate from the product.

The metal deactivators of this invention are prepared in much the same manner as conventional metal deactivators using known reagents, conditions and equipment. The processes taught in U.S. Pat. Nos. 4,043,976, 3,931,103 and 3,798,286 are illustrative. Typically, these deactivators are prepared through esterification or alkoxylation of aromatic polycarboxylic acids, e.g., terephthalic acid, into alkylated or alkoxylated aromatic acid, e.g., terephthalic acid. The final hydrazine derivative involves a reaction with, for example, anhydrous hydrazine. Alternatively, a thionyl chloride route is viable.

The olefin polymer composition of this invention typically comprises at least 0.001, preferably at least 0.005, more preferably at least 0.01 and even more preferably at least 0.05, wt % of the metal deactivator. The maximum amount of metal deactivator is a factor of convenience, cost and diminishing returns, but a typical maximum amount is 0.3, more typically 0.2 and even more typically 0.1, wt % based on the weight of the olefin polymer composition.

Polyolefins suitable for use in this invention include, but are not limited to, LLDPE, LDPE, HDPE, medium density polyethylene, ultralow density polyethylene, chlorinated polyethylene, ethylene-propylene terpolymers (e.g., ethylene-propylene-butadiene), polypropylene, polybutadiene, styrene-acrylonitrile (SAN), acrylonitrile-butadiene-styrene (ABS), ethylene vinyl acetate (EVA), ethylene-propylene copolymers (EP), silicone rubber, chlorosulfonated polyethylene, fluoroelastomers and the like. In addition, blends of two or more polymers may be employed. The olefin polymers can be amorphous or crystalline, and can vary widely in terms of density, molecular weight, polydispersity, melt temperature, etc. These olefin polymers can also be made by a wide variety of processes, e.g., gas, slurry or solution polymerization, in series or parallel reactors, with in-reactor or post-reactor blending, with a Ziegler-Natta, metallocene or constrained geometry catalyst, and the like.

The olefin polymer compositions can contain other additives such as, for example, other antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), fillers and/or flame retardants (e.g., talc, calcium carbonate, organo-clay, glass fibers, marble dust, cement dust, feldspar, silica or glass, fumed silica, silicates, alumina, antimony trioxide, zinc oxide, barium sulfate, silicones, titanium oxides, expandable graphite, etc.) colorants or pigments to the extent that they do not interfere with the effectiveness of the metal deactivators of this invention. These other additives are employed in functionally equivalent amounts known to those skilled in the art, generally in amounts of up to about 0.3 percent by weight, based upon the total weight of the composition.

The olefin polymer compositions of this invention can be prepared using any process that produces a relatively homogeneous mixture of olefin polymer, metal deactivator and any additives that may be present. These processes include dissolving or dispersing the metal deactivator in a low-boiling solvent, mixing the solution or dispersion with an olefin polymer and removing the solvent by evaporation. Alternatively, the olefin polymer is heated above its melting temperature and the metal deactivator added with appropriate agitation. Still another process is mixing the olefin polymer and metal deactivator in conventional mixing equipment, e.g., an extruder.

In one embodiment, the preparation procedure for the metal deactivator starts with the esterification of an alcohol or a hydroxyl-containing entity with a carboxylic acid substituted phenyl entity, e.g., terephthalic acid, typically in a flask under reflux conditions. As the ester is formed, water is separated off. The ester is then reacted with any hydrazine adduct at a lower temperature either in the presence or absence of a polar solvent to form a compound of the formula R—O—(CO)—Ar—(CO)—(NH)—NH$_2$. This compound can be further converted at higher temperature in the presence or absence of a solvent like tetrahydrofuran (THF), benzene or xylene to form R—O—(CO)—Ar—(CO)—(NH)—(NH)—(CO)—Ar—(CO)—O—R. The final product is obtained after washing the product with water and re-crystallizing it in a polar solvent or other suitable solvent.

In another embodiment, the hydrazine substitution step at higher temperature is replaced with reacting R—O—(CO)—Ar—(CO)—(NH)—NH$_2$ with R—O—(CO)—Ar—(CO)—Cl and removal of hydrochloric acid as a by-product. The R groups may be the same or different entities based on alkyl, alkoxy or structures that are a combination of two or more of these groups. If desired more hydrazine may be used to convert a compound like R—O—(CO)—Ar—(CO)—O—R into a hydrazine derivative with a repeat of group a group such as Ar—(CO)—(NH)—(NH)—(CO). This results in more deactivation capacity per molecule.

Alkoxylated raw materials (R groups) may be prepared through conventional alkoxylation chemistry as used in general anionic polymerization processes.

The metal deactivator as prepared above any of the processes described above may then be worked (compounded or other fabrication process) into the polymer that requires protection from heavy metals at a dose that is suitable for the application. The optimum size of the dose can be determined by a person skilled in the art of additive chemistry by rating the sensitivity of the polymer for heavy metals, the degree of heavy metal contact in the final application, and the conditions and the duration of use.

Although the invention has been described in considerable detail by the preceding examples, this detail is for the purpose of illustration and is not to be construed as a limitation upon the scope and spirit of the appended claims. All U.S. patents, allowed U.S. patent applications and U.S. patent application Publications cited above are incorporated herein by reference.

What is claimed is:

1. An olefin polymer composition comprising a stabilizing amount of a metal deactivator of the formula I:

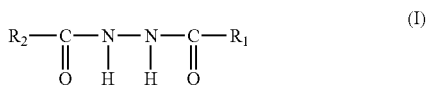

in which at least one of $R_1$ and $R_2$, are of formula (II):

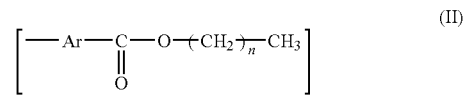

in which Ar is a substituted or unsubstituted aromatic group, and n is an integer of 1 to 10;
or
at least one of $R_1$ and $R_2$ are of formula (III):

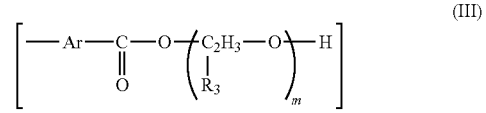

in which Ar is a substituted or unsubstituted aromatic group, m is an integer of 1 to 1000, and $R_3$ is hydrogen or a $C_{1-12}$ alkyl group;
or
at least one of $R_1$ and $R_2$ are of formula (IV):

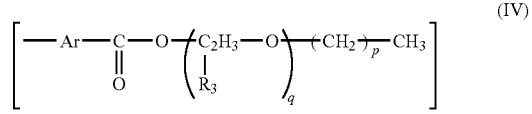

in which Ar is a substituted or unsubstituted aromatic group, and each of p and q is an integer of at least one, in which $R_1$ and $R_2$ are not both of formula (II).

2. The composition of claim 1 in which both $R_1$ and $R_2$ are of formula (III) or (IV).

3. The composition of claim 1 in which $R_1$ and $R_2$ are of different formulas selected from formulas (II), (III) and (IV).

4. The composition of claim 1 in which the olefin polymer is polyethylene or polypropylene.

5. The composition of claim 1 in which the metal deactivator is present in an amount of at least 0.001 wt % based on the weight of the composition.

6. The composition of claim 1 in which $R_1$ is of formula (II) and $R_2$ is of formula (III).

7. The composition of claim 1 in which $R_1$ is of formula (II) and $R_2$ is of formula (IV).

8. The composition of claim 1 in which $R_1$ is of formula (III) and $R_2$ is of formula (IV).

* * * * *